United States Patent [19]

Mischenko

[11] Patent Number: 5,295,206
[45] Date of Patent: Mar. 15, 1994

[54] FIBEROPTIC TEMPERATURE TRANSDUCER

[75] Inventor: Peter S. Mischenko, Mount Prospect, Ill.

[73] Assignee: Metatech Corporation, Lake Forest, Ill.

[21] Appl. No.: 956,678

[22] Filed: Oct. 5, 1992

[51] Int. Cl.⁵ .................................................. G02B 6/02
[52] U.S. Cl. ..................... 385/12; 250/231.1; 374/55; 374/130; 374/131; 385/15
[58] Field of Search .................. 250/227.21, 231.1; 374/131, 130, 55; 385/12, 13, 18, 147, 15, 39, 47

[56] References Cited

U.S. PATENT DOCUMENTS 4,176,551 12/1979 Hammer et al. ...................... 374/161
4,672,199 6/1987 Anderson et al. .............. 250/227.21

Primary Examiner—John D. Lee
Assistant Examiner—John Ngo
Attorney, Agent, or Firm—Jones, Day, Reavis & Pogue

[57] ABSTRACT

A temperature measuring system that utilizes an electronic control unit and a rod made of a first material with a first thermal coefficient of expansion, the rod being attached at one end within a tubular device made of a material having a second coefficient of expansion. A reflecting surface is on the outer end of the rod of first material. At least one optical fiber is associated with the tubular member and is located so as to create a gap between the optical fiber and the reflecting surface. The first and second materials are chosen based upon their respective coefficients of thermal expansion such that a change in temperature of both materials will cause the length of the gap to either increase or decrease, thereby causing a change in the amount of light that is reflected and detected by the optical fibers.

17 Claims, 2 Drawing Sheets

FIBEROPTIC TEMPERATURE TRANSDUCER

FIELD OF THE INVENTION

The present invention relates in general to temperature transducers and in particular to a fiberoptic transducer including first and second materials having different thermal coefficients of expansion, the first material including a source for projecting a light beam and a receptor for receiving reflected light and the second material having a light reflective surface from which the light beam projected from the first material is reflected back toward the receptor of the first material; the first and second materials being positioned in a spaced, adjacent manner such that, with a change in temperature, the space between the materials changes thus changing the amount of reflected light received by the receptor of the first material.

BACKGROUND OF THE INVENTION

The basic principle of fiberoptic transducers involves shining a light on a reflective surface and measuring how much light is reflected back. It is known that the amount of light that is reflected is determined by the distance that the reflective surface is located from the light source and the light collector used.

In general, fiberoptic transducers use one or more fibers to channel light from a light source to and reflect off a reflective surface and uses one or more fibers to collect the reflected light from the reflected surface and channel it to a measuring device. Fiberoptic transducers have been used for optical pyrometry as disclosed in U.S. Pat. No. 4,468,771 and for measuring a quantity of heat applied to the end of an exposed fiber portion of an optical fiber as disclosed in U.S. Pat. No. 5,009,513.

The present invention relates to a fiber optic temperature transducer that may be located in the end of a small tube for measuring temperatures in remote or difficult areas to access, such as for determining the temperature in a particular area of a human body and which area might be accessed by a flexible tube inserted in a blood vessel and guided to the appropriate area of the body. The present transducers also may be used safely for measuring temperatures in areas where an electrical spark may cause combustible gases on liquids to ignite.

The fiberoptic temperature transducer in accordance with the present invention includes a temperature measuring system involving an electronic control unit, a reflecting member attached to, or part of, a rod made of a first material, the remote end of the rod with the reflecting member being free to move within a tubular member made of a second material. The other end of the rod is attached to the tubular member. At least one optical fiber is carried by a support member in the tubular member and extends therethrough. The end of the at least one optical fiber is spaced from the reflective member so as to create a gap. The first and second materials are chosen, based upon their respective coefficients of thermal expansion, such that a change in temperature of both materials will cause the length of the gap to either decrease or increase linearly, thereby causing a change in the amount of light that is reflected and detected by the optical fiber. Two optical fibers may be used if desired. One transmits the light to the reflective surface and the other receives it from the reflective surface and transmits it to the processing system. The sensitivity of the temperature measuring capability is determined by choosing the length of the rod in conjunction with the type of first and second materials used. The output signal of the collecting optical fiber is conditioned and processed by the electronic control unit and the temperature measurement can be displayed on a digital or analog readout.

Thus it is an object of the present invention to provide a fiberoptic temperature transducer.

It is also an object of the present invention to provide a fiberoptic temperature transducer that has first rod member surrounded in spaced relationship with a second coaxially aligned tubular body member with the first rod member having a first thermal coefficient of expansion and the second tubular body member having a second thermal coefficient of expansion. A cylindrical fiberoptic support member is spaced from and axially aligned with the first rod member in the tubular body member such that with a change in temperature, the difference in expansion or contraction of the materials of the first rod member and the second tubular body member causes the amount of space between the first rod member and the support member to vary. A reflecting surface on the end of the first rod member faces the support member and at least one optical fiber is attached to the end of the support member facing the first rod member, such that the amount of light reflected from the reflecting surface to the optical fiber varies with a change in temperature and thus a change in the space between the first rod member and the support member.

It is still another object of the present invention to provide a temperature transducer wherein the materials having the first and second thermal coefficients of expansion have properties such that the change in gap length between one body member and a support member caused by expansion is a substantially linear change with a change in temperature.

It is yet another object to the present invention to provide a temperature transducer with a tubular member formed of a material having a first thermal coefficient of expansion and a cylindrical rod formed of a material having a second thermal coefficient of expansion and inserted in and attached at only one end to the tubular member for expansion within the tubular member and wherein the length of the cylindrical rod varies with the materials chosen for the rod and the tubular member to determine the sensitivity of the temperature measuring capability within a chosen temperature operating range.

SUMMARY OF THE INVENTION

Thus, the invention relates to a temperature transducer comprising a tubular member formed of a material having a first thermal coefficient of expansion. A cylindrical rod is formed of a material having a second thermal coefficient of expansion, the cylindrical rod being inserted in and attached at only one end to the tubular member for expansion within the tubular member. A reflective surface is coupled to the other end of the cylindrical rod and at least one optical fiber is attached to a support member in the tubular member and positioned a predetermined distance from the reflecting surface to form a gap such that a change in temperature of both the tubular member and the cylindrical rod will cause the gap to change in length so as to change the amount of light being reflected, the change of reflected light representing the change in temperature.

BRIEF DESCRIPTION OF THE DRAWINGS

These and other features, objects and advantages of the present invention will be more fully disclosed when taken in conjunction with the following detailed description of the drawings in which like numerals represent like elements and in which.

DETAILED DESCRIPTION OF THE DRAWINGS

Figure 1:
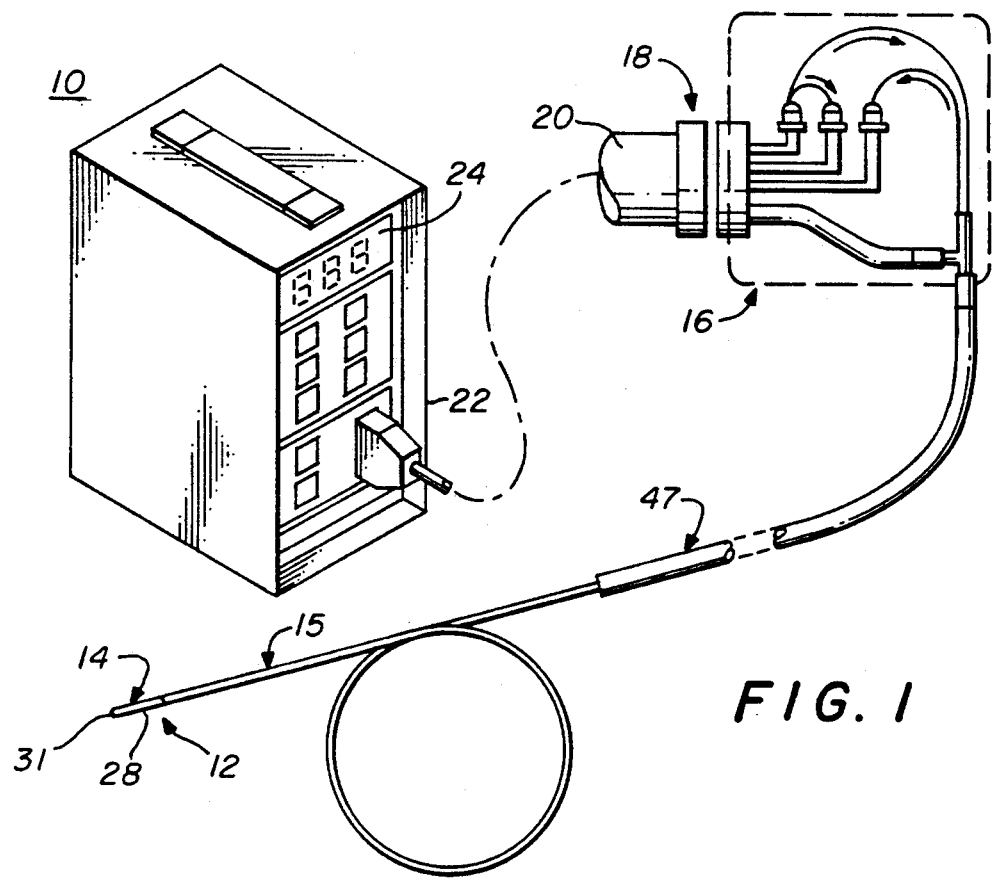
FIG. 1 is a diagrammatic representation of a system that utilizes a fiberoptic temperature transducer and includes a probe or catheter containing fiberoptic rods, light connectors and a device for displaying temperature measurements as a readout.
Figure 2:
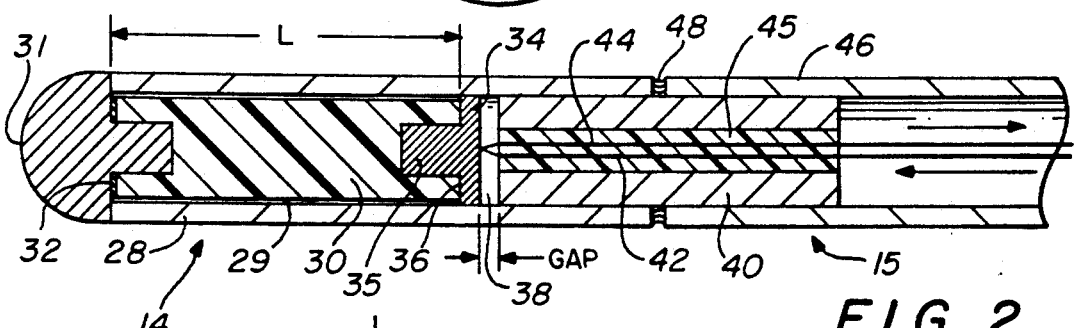
FIG. 2 is a cross-sectional view of a tip section coupled to a flexible tubing of a fiberoptic temperature probe or catheter illustrating the details of the fiberoptic temperature transducer therein.

A system 10 is illustrated diagrammatically in FIG. 1 that involves a fiberoptic temperature transducer in the form of a probe or catheter 12 having a tip section 14 coupled to a flexible tubing 15 which includes fiberoptic rods or optical fibers 42, 44 therein, as illustrated in FIG. 2. These fiberoptic rods or optical fibers 42 and 44 are provided for purposes of transmitting light to and receiving light from the tip section 14 of probe 12. In the system, a well-known converter 16 is employed which provides a light source and means for transmitting light emitted by such light source to the tip section 14 of fiberoptic probe 12 through fiberoptic rod 42, for example. In the tip section 14, the light is projected from fiberoptic rod 42 and is reflected off of a reflective surface 34 into fiberoptic rod 44 wherein it is transmitted back to converter 16. As will be discussed in detail hereinafter, the amount of reflected light returning to the converter varies according to temperature. The reflected light is received at converter 16 and is transduced into an electrical signal that is coupled through a plug 18 and conductor 20 to an electronic control unit 22 that has a digital readout 24. Clearly, the electronic control unit 22 could have an analog readout 24 instead of a digital readout.

In a preferred embodiment, of this invention the flexible tubing 15 and tip section 14 have a diameter of approximately 0.5-2.0 mm and the temperature probe 12 can be used to measure a temperature at a remote location such as a body portion, wherein the probe 12 is inserted through a blood vessel and moved to the area of the body where it is desired to measure the temperature.

The temperature transducer of this invention shaped as the fiberoptic probe or catheter 12 including a tip section 14 coupled to flexible tubing 15 is shown in cross-sectional detail in FIG. 2. The probe or catheter 12 has a first tubular member 28 formed of a material such as stainless steel having a first thermal coefficient of expansion. A cylindrical rod 30 is formed of a material such as TEFLON ®, a registered trademark, having a second thermal coefficient of expansion and is inserted in and attached only at the end 32 by engagement with an outer cap 31 on the tubular member 28 for expansion within the tubular member 28. It will be noted that a small space 29 exists between the tubular member 28 and the cylindrical rod 30 sufficient to allow expansion of the stainless steel tubular member 28 and the TEFLON ® rod 30 without touching each other. A member 35 having the reflective surface 34 thereon is attached to the other end 36 of the cylindrical TEFLON ® rod 30 in any well-known manner. An air gap 38 exists between the light reflecting surface 34 and the end of a stainless steel support member 40 positioned within the tubular member 28. Fiberoptic rods 42 and 44 are shown mounted in an epoxy 45 in a spaced side-by-side relationship within support member 40. Stainless steel support 40 is attached to the tubular member 28 in any well-known manner such as by using a glue. In operation, fiberoptic rod 42 may, for example only, supply light originating from the converter 16 to the reflecting surface 34 and the light projecting from rod 42 onto reflecting surface 34 is reflected back through the fiberoptic rod 44 to return to the converter 16.

A second tubular member 46 acts as a conduit for fiberoptic rods 42, 44 and is attached to support member 40 at a proximal end by any well-known manner which normally will be the same technique as employed to attach tubular member 28 and support 40. Section 48 bridging the gap between tubular members 28 and 46 is formed of an adhesive filler material providing a smooth transition between the two tubular sections which is of importance in medical catheter construction. The distal end of tubular member 46 is sheathed within a protective coating 47 which extends back to converter 16. With the fiberoptic rods 42 and 44 attached to the stainless steel support member 40 of the tubular member 28 and positioned a predetermined distance from the reflecting surface 34 to create gap 38, a change in temperature of both the stainless steel tubular member 28 and the TEFLON ® cylindrical rod 30 will cause the gap 38 to change in length so as to change the amount of light being reflected. The change of reflected light represents the change in temperature. The materials forming the tubular member 28 and the cylindrical rod 30 are chosen so that the change in the gap is a linear or near linear function with change in temperature. Thus the materials may be stainless steel, TEFLON ® or any other materials that will give a linear relationship in the gap length with temperature change. Further, the length L of the cylindrical rod 30 is chosen in conjunction with the materials 28 and 30 to determine the sensitivity of the temperature measuring capability within a chosen operating range. The calculations for a gap length change with temperature are set forth hereafter.

Assume a material A attached at one end to a cantilevered beam of material B and spaced at the other end from the material B to form a gap G. Assume the length of material A to be $L_A$ and the length of material B from the point of attachment to material A to the outer end of the gap G to be $L_B$. The following definitions apply:

| | |
|---|---|
| $DT =$ | change in temperature; |
| $DL_A =$ | change in length of $L_A$ due to change in temperature, DT; |
| $DL_B =$ | change in length of $L_B$ due to change in temperature, DT; |
| $DG =$ | change in length of gap G due to change in DT; |
| $C_A =$ | coefficient of expansion of material A; and |

| | |
|---|---|
| $C_B$ = | coefficient of expansion of material B. |

Then,
(1) $DL_A = L_A \times C_A \times DT$;
(2) $DL_B = L_B \times C_B \times DT$; and
(3) $DG = (L_A \times C_A \times DT) - (L_B \times C_B \times DT) = DT(L_A \times C_A - L_B C_B)$.

If, for example, $L_B - L_A = 0.0015$ inch and if $L_A$ is large with respect to the gap G, such as 0.25 inch, then it can be said that $L_A$ and $L_B$, for practical purposes, equal in length. Then, from (3), (4)$DG = DT \times L_A(C_A - C_B)$.

Figure 3:
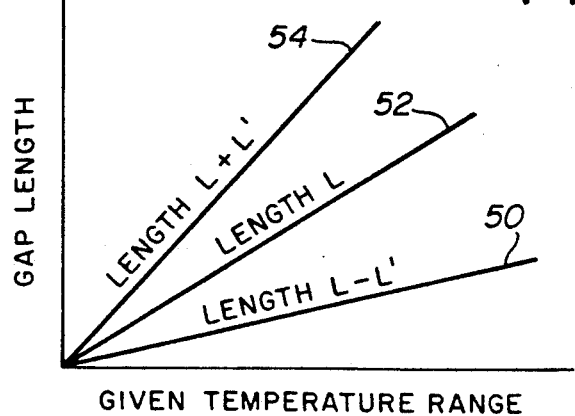
FIG. 3 is a graph of the gap length versus a given temperature range with a particular length cylindrical rod and a given first and second material forming the tubular member and cylindrical rod.

Thus, as may be seen in FIG. 3, which is a graph of gap length versus a given temperature range for a variable length rod member 30, for a given change of temperature, curve 52 creates a small gap length change for a given length L and a given temperature change. When the length of rod 30 is decreased by L', as illustrated by the graph 50, the gap length is less for the same given temperature increase. The greatest change in gap length for a given change in temperature is illustrated by graph 54 when the length of rod 30 is increased by L'. Thus, the sensitivity of the temperature measuring capability of the device within a chosen operating range is determined by the length L of the rod 30 when taken in conjunction with the material forming the tubular member 28 and having the first thermal coefficient of expansion and the material forming the cylindrical rod 30 and having the second thermal coefficient of expansion. As stated previously, the materials forming the tubular member 28 and the rod 30 are chosen so that the change in the gap is a linear or near linear change with change in temperature as illustrated in FIG. 3. The material forming the tubular member 28 is preferably stainless steel and may be any one of a group of corresponding materials with a like thermal coefficient of expansion that are not harmful to the body. In like manner, the material forming the rod 30 is preferably formed of TEFLON ® but may be selected from any material having a corresponding thermal coefficient of expansion.

Also as stated previously, a single fiberoptic rod 42 may be used to both transmit and receive light as illustrated in U.S. Pat. No. 4,691,708, incorporated herein by reference in its entirety. The preferred embodiment, however, utilizes the two rods 42 and 44 as shown in FIG. 2.

Figure 4:
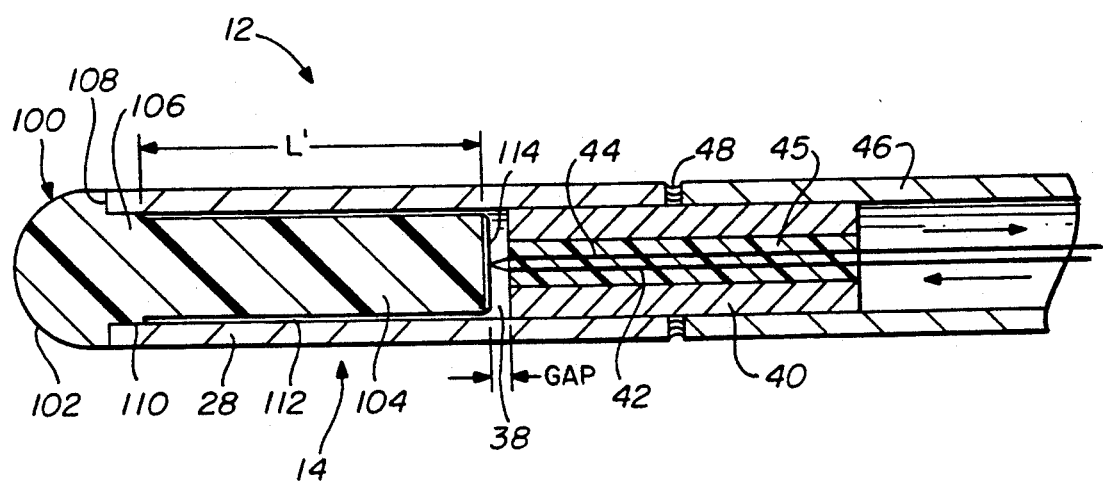
FIG. 4 is a cross-sectional view of an alternative embodiment of a fiberoptic temperature probe or catheter illustrating an alternative tip section construction.

In FIG. 4, the tip section 14 of probe or catheter 12 is illustrated having an expansion member 100 formed as a unitary structure with three integral sections comprising a cap-like section 102, a rod-like section 104 having a length and a cylindrical attachment section 106 intermediate the cap-like and the rod-like sections. In construction, rod-like section 104 is inserted into tubular member 28 in a manner such that cap-like section 102 projects anteriorly outwardly from member 28 with an end portion 108 of cap-like section 102 in abuttment with the tubular member 28 and with circumferentially outer portion 110 of cylindrical section 106 also in abuttment with tubular member 28 for attachment or joinder thereto in any well-known manner such as by use of a bonding adhesive. A small space 112 is formed between tubular member 28 and rod-like section 104 of expansion member 100 so that rod-like section 104 and tubular member 28 which are fashioned from materials having different thermal coefficients of expansion can expand without touching each other in the same manner as with the embodiment of FIG. 2. A reflective surface 114 is provided integral with the interior face of rod-like section 104 so that in operation, the light supplied via fiberoptic rod 42 and reflected back into fiberoptic rod 44 off of reflective surface 114 can be measured by converter 16 to provide an indication of a change in temperature resulting from a change in the length of gap 38 caused by the expansion of rod-like section 106 relative to tubular member 28.

Thus, there has been disclosed a novel temperature transducer utilizing at least one fiberoptic rod in which first and second coaxially aligned body members, such as 28 and 30 in FIG. 2 or 28 and 100 in FIG. 4, are held in spaced relationship with each other. The first body member 28 has a first thermal coefficient of expansion and the second body member 30 or 100 has a second thermal coefficient of expansion. A support member 40 is attached to the tubular member 28 such that, with a change in temperature, the amount of space 38 between the first member 30 or 100 and the support member 40 varies. A reflecting surface 34 on the end of the first body member 30 in FIG. 2 or reflecting surface 114 on the end of member 100 in FIG. 4 faces the support member 40. At least one optical fiber 42 is mounted in and extends to the end of the support member 40 facing the first body member 30 or 100, such that the amount of light reflected from the reflecting surface 34 or 114 to the optical fiber 42 varies with a change in temperature and thus a change in space between the first and second body members.

The foregoing specification describes only the embodiments of the invention shown and/or described. Other embodiments may be articulated as well. The terms and expressions used, therefore, serve only to describe the invention by example and not to limit the invention. It is expected that others will perceive differences which, while different from the foregoing, do not depart from the scope of the invention herein described and claimed. In particular, any of the specific constructional elements described may be replaced by any other known element having equivalent function.

I claim:

1. A fiberoptic temperature transducer comprising:
   a tubular member formed of a material having a first thermal coefficient of expansion;
   a cylindrical rod-like expansion member formed of a material having a second coefficient of expansion;
   at least a portion of said expansion member being inserted in and attached at only one end to the tubular member for expansion within the tubular member;
   a reflective surface positioned at the other end of the expansion member distal from said attached end; and
   at least one fiberoptic rod associated with the tubular member and positioned a predetermined distance from the reflective surface with a gap therebetween such that a change in temperature of both the tubular member and the cylindrical rod-like member causes the gap to change in length so as to change the amount of light reflected from said reflective surface and received by said at least one fiberoptic rod, the change of received reflected light representing the change in temperature.

2. A temperature transducer as in claim 1 wherein the at least one fiberoptic rod comprises:
   a first fiberoptic rod for transmitting light to the reflective surface; and a second fiberoptic rod for receiving reflected light from the reflective surface.

3. A temperature transducer as in claim 1 wherein the materials have first and second thermal coefficients of expansion such that the change in gap length is a substantially linear change with a change in temperature.

4. A temperature transducer as in claim 1 wherein said portion of said expansion member inserted in said tubular member is a cylindrical rod and the length of the cylindrical rod and the materials chosen for the expansion member and the tubular member determine the sensitivity of the temperature measuring capability within a chosen operating range.

5. A temperature transducer as in claim 4 wherein the gap is an air filled gap.

6. A temperature transducer comprising:
a tubular member formed of a material having a first thermal coefficient of expansion;
a cylindrical rod formed of a material having a second coefficient of expansion;
the cylindrical rod being inserted in and attached at only one end to the tubular member for expansion within the tubular member;
a reflective surface positioned at the other end of the cylindrical rod distal from said attached end; and
at least one fiberoptic rod associated with the tubular member and positioned a predetermined distance from the reflective surface to form a gap therebetween such that a change in temperature of both the tubular member and the cylindrical rod causes the gap to change in length so as to change the amount of light reflected from said reflective surface and received by said at least one fiberoptic rod, the change of reflected light representing the change in temperature.

7. A temperature transducer as in claim 6 wherein the at least one fiberoptic rod comprises:
a first fiberoptic rod for transmitting light to the reflective surface; and
a second fiberoptic rod for receiving reflected light from the reflective surface.

8. A temperature transducer as in claim 6 wherein the materials have first and second thermal coefficients of expansion such that the change in gap length is a substantially linear change with a change in temperature.

9. A temperature transducer as in claim 6 wherein the length of the cylindrical rod and the materials chosen for the rod and the tubular member determine the sensitivity of the temperature measuring capability within a chosen operating range.

10. A temperature transducer as in claim 9 wherein the gap is an air filled gap.

11. A method of forming a temperature transducer comprising the steps of:
forming a tubular member of a material having a first thermal coefficient of expansion;
forming a cylindrical rod of a material having a second coefficient of expansion with a reflective surface at one end thereof;
inserting the cylindrical rod in and attaching it to the tubular member only at a position distal to said end with said reflective surface for expansion within the tubular member; and
positioning at least one fiberoptic rod associated with the tubular member at a predetermined distance from the reflective surface to form a gap between said reflective surface and said at least one fiberoptic rod such that a change in temperature of both the tubular member and the cylindrical rod causes the gap to change in length so as to change the amount of light being reflected from said reflective surface and received by said at least one fiberoptic rod, the change of received reflected light representing the change in temperature.

12. A method as in claim 11 further comprising the steps of:
transmitting light to the reflective surface with a first fiberoptic rod; and
receiving said reflected light from the reflective surface with a second fiberoptic rod.

13. A method as in claim 11 further comprising the step of using materials in the tubular member and the cylindrical rod having first and second thermal coefficients of expansion, respectively, such that the change in gap length is a substantially linear change with a change in temperature.

14. A method as in claim 11 further comprising the step of determining the sensitivity of the temperature measuring capability of the temperature transducer within a chosen operating range by selecting the length of the cylindrical rod based on the materials chosen for the rod and the tubular member.

15. A method as in claim 14 further comprising the step of forming an air filled gap between the cylindrical rod and the optical fiber.

16. A temperature transducer comprising:
first and second coaxially aligned body members, said first body member being positioned within said second body member and being attached at only one end to said second body member, said first and second body members being held in spaced relationship with each other;
the first body member having a first thermal coefficient of expansion and the second body member having a second thermal coefficient of expansion such that with a change in temperature the respective length of the first and second members varies;
a support member in axial alignment with the first body member;
a reflecting surface on the other end of the first body member distal from said attached end facing the support member; and
at least one fiberoptic rod mounted in the support member facing the first body member, such that the amount of light reflected from the reflecting surface to the at least one fiberoptic rod varies with a change in temperature and thus a change in the respective length of the first and second body members.

17. A temperature transducer as in claim 16 wherein the at least one fiberoptic rod comprises:
a first fiberoptic rod for transmitting light to the reflective surface; and
a second fiberoptic rod for receiving reflected light from the reflective surface.

* * * * *